United States Patent [19]

Guagliumi et al.

[11] Patent Number: 4,541,284
[45] Date of Patent: Sep. 17, 1985

[54] DEVICE FOR MONITORING THE PRESSURE OF FLUID IN A DUCT

[75] Inventors: Renato Guagliumi, Turin; Giampiero Perga, Leinì, both of Italy

[73] Assignee: Marelli Autronica S.p.A., Pavia, Italy

[21] Appl. No.: 592,970

[22] Filed: Mar. 23, 1984

[30] Foreign Application Priority Data

Mar. 23, 1983 [IT] Italy .............................. 53101/83[U]

[51] Int. Cl.⁴ .............................................. G01L 9/08
[52] U.S. Cl. .................................. 73/730; 73/DIG. 4; 73/754; 73/756
[58] Field of Search ............... 73/730, DIG. 4, 119 A, 73/756, 754; 310/338

[56] References Cited

U.S. PATENT DOCUMENTS 4,304,126 12/1981 Yelke ................................. 73/119 A
4,321,833 3/1982 Zeiringer ............................. 73/730

Primary Examiner—Donald O. Woodiel
Attorney, Agent, or Firm—Sughrue, Mion, Zinn, Macpeak and Seas

[57] ABSTRACT

A device for monitoring the pressure of fluid in an electrically conductive duct, such as an injection duct of a diesel engine, includes at least one electrical pressure transducer connectible mechanically and electrically to the outer surface of the duct, and support means for keeping the transducer in connection with the duct. A rigid casing for surrounding and protecting the support means and the transducer is formed in two parts which are hinged together so as to clamp the transducer to the duct. This casing is constituted at least in part by an electrically conductive material and has an internal electrical connection with the output of the transducer, whereby signals output by the transducer in operation can be picked up directly by the casing.

1 Claim, 3 Drawing Figures

DEVICE FOR MONITORING THE PRESSURE OF FLUID IN A DUCT

The present invention relates to a device for monitoring the pressure of fluid in a duct of electrically conductive material, for example, an injection duct of a diesel engine. More particularly, the invention is concerned with a device of the type comprising:

at least one electrical pressure transducer connectible mechanically and electrically to the outer surface of the duct, support means for keeping the transducer in connection with the duct, and a rigid casing surrounding and protecting the support means and the transducer, the casing preferably being formed in two parts which are hinged together in the form of pincers and are intended to clamp the transducer to the duct by means of the support means.

Such a pressure monitoring device is known, for example, from Italian patent application No. 29654-A/78. In a practical embodiment of the device described in this patent application, the rigid casing is made of electrically insulating material and the two parts composing it are hinged together by means of a pin. In this known device, a conductive blade mounted on the pin of the casing is used for picking up the signal output by the pressure transducer in use. The signal is then taken up through a cable terminal.

This known device has the disadvantage that, as a result of creep, the conductor blade may fail or at least cause the electrical contact to be unreliable, with a consequent deterioration in the overall performance of the device.

The object of the present invention is to provide a device for monitoring the pressure of fluid in an electrically conductive duct of the type specified above, which is free from the disadvantages of the prior devices and allows a simpler and more reliable pick-up of the signal output by the transducer in operation. The invention has the further object of providing a monitoring device which is simple and easy to assmble and install.

These objects are achieved according to the invention by means of a monitoring device of the aforesaid type, the main characteristic of which lies in the fact that the rigid casing is constituted at least in part by an electrically conductive material and has an internal electrical connection with the electrical terminal for the output of signals from said at least one transducer housed therein, whereby the signals from the transducer can be picked up directly by the casing in operation.

According to further characteristics of the device according to the invention, the casing is made from metal, preferably die-cast aluminium.

Further characteristics and advantages of the monitoring device according to the invention will become apparent from the detailed description which follows with reference to the appended drawings provided purely by way of non-limiting example, in which.

Figure 1:
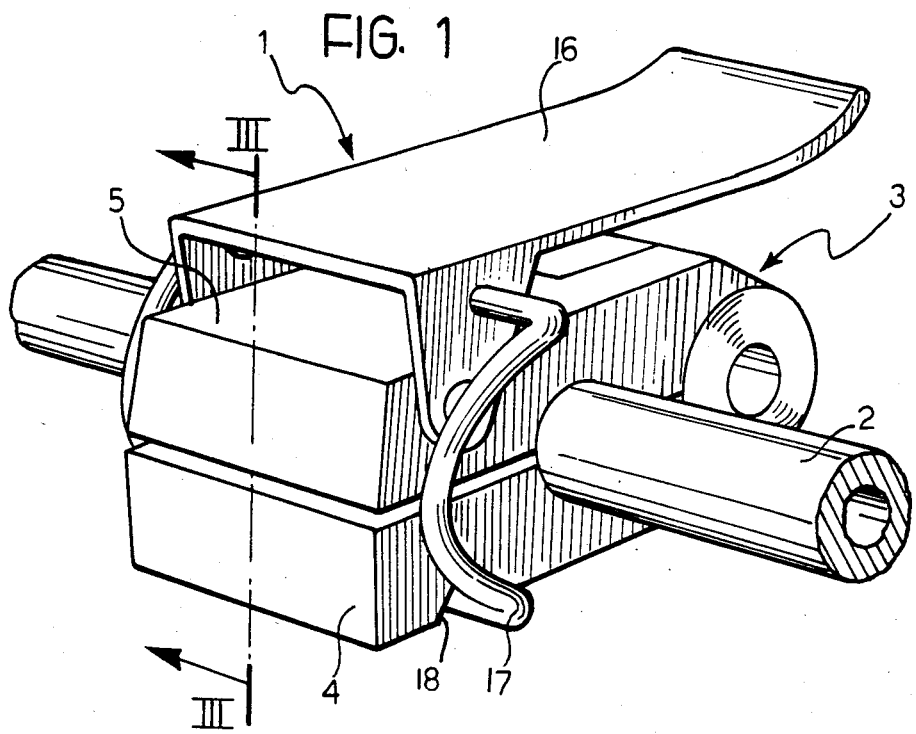
FIG. 1 is a perspective view of a monitoring device according to the invention.
Figure 3:
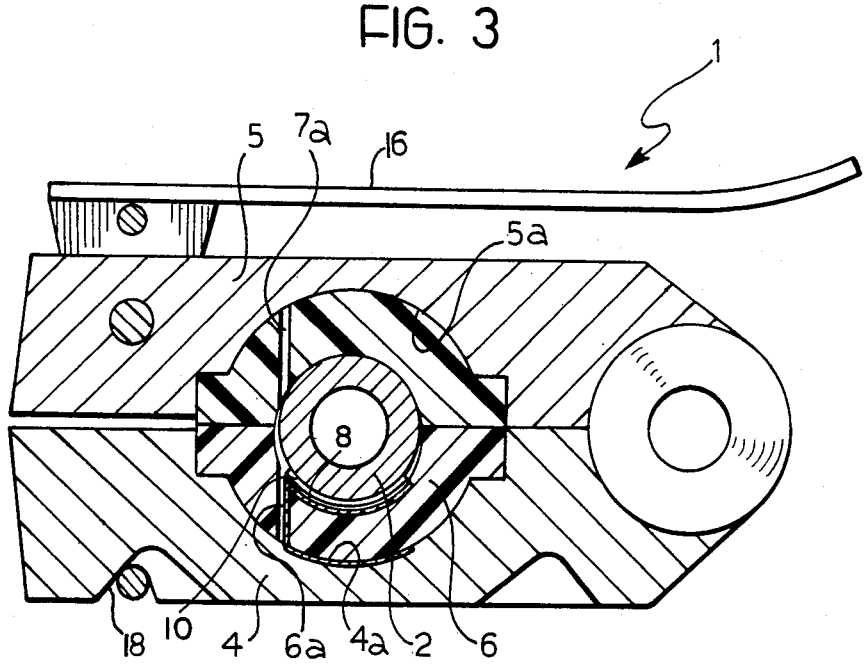
FIG. 3 is a longitudinal sectional view taken on the line III—III of FIG. 1.

With reference to FIGS. 1 and 3, a monitoring device according to the invention, generally indicated 1, is intended to monitor the pressure of fluid in an electrically conductive duct 2, for example and in particular, an injection duct for a diesel engine.

In known manner, the monitoring device includes a rigid casing, generally indicated 3, formed in two parts 4, 5 articulated together about a hinge at one end and intended to be closed around the pipe or duct 2 in the form of a pincer.

The part 5 of the casing carries a toggle clamping mechanism of conventional type, comprising a locking and unlocking lever 16 and a ring 17 of wire or the like engageable in a groove 18 formed on the lower face of the lower part 4 of the rigid casing 3.

Figure 2:
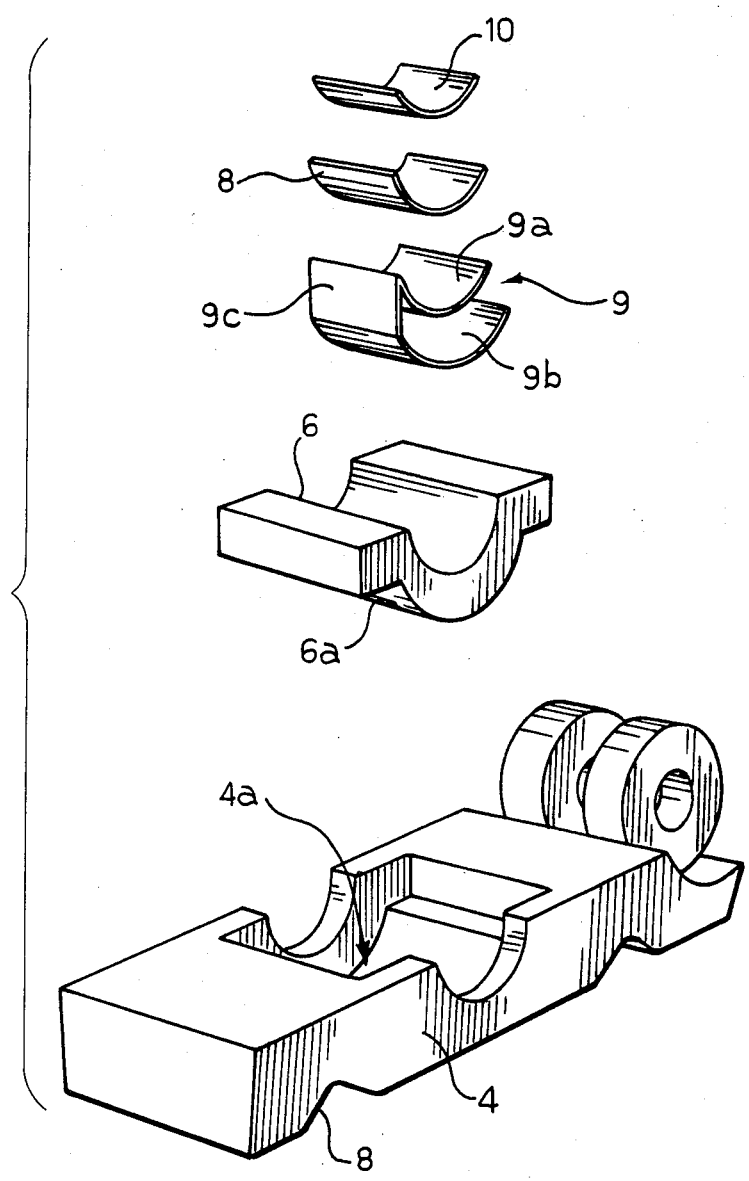
FIG. 2 is a partially-exploded perspective view of part of the device shown in FIG. 1.

Each of the two parts 4, 5 of the casing 3, as shown in detail in FIGS. 2 and 3, has a respective recess or seat 4a, 5a which is substantially semi-cylindrical. The end walls of these seats have essentially semi-circular notches corresponding substantially to half the section of the pipe or duct 2 to which the monitoring device is to be applied.

Respective, substantially semi-annular positioning and support elements 6, 7 or an electrically insulating and resilient material are disposed in the seats 4a, 5a of the two parts of the casing.

Each of the positioning and support elements 6, 7 has a respective slit 6a, 7a extending from the concave face to the convex face of the respective positioning and support element.

Each of the two parts of the rigid casing 3 is associated with a respective electrical pressure transducer constituted, for example, by a piezoelectric film having, for example, a thickness of the order of 30–40 microns and having metallization on each of its faces to act as an electrode. In FIG. 2, the transducer carried by the lower part 4 of the rigid casing 3 is indicated 8. This transducer is located on the concave face of the positioning and support element 6. Between the lower face of the transducer 8 and the surface of the positioning and support element 6 is interposed a first portion 9a of a conductive blade 9 having, for example, a thickness of the order of 20–25 microns. This blade has a further portion 9b connected to the portion 9a by means of an intermediate portion 9c. Upon assembly, the blade 9 is passed through the slit 6a in the positioning element 6 so that the portion 9b of this blade is disposed between the convex surface of the positioning element 6 and the bottom of the seat 4a of the casing intended to receive this positioning element.

On the upper face of the piezoelectric transducer 8 is a leaf of electrically conductive material, for example brass, indicated 10 in FIG. 2.

In order to make the structure more solid, the conductive leaf 10 may be glued around its periphery to the upper face of the transducer 8; the lower face of the latter may in its turn be glued to the positioning and support element 6. Even the blade 9 may be glued to the positioning and support element 6.

Naturally, the structure of the part of the monitoring device housed in the upper part 5 of the rigid casing 3 is almost identical to that shown in FIG. 2 and described with reference to the part of the device supported in the lower part of the casing.

According to the invention, the two parts 4, 5 of the rigid casing 3 are constituted (at least in part) by an electrically conductive material, such as die-cast aluminium. The conductive blade 9 thus fulfils the function of electrically connecting the electrode or output terminal of the piezoelectric sensor 8 to the casing itself.

Similarly, an electrical terminal of the piezoelectric sensor housed in the upper portion of the monitoring device is connected electrically to the casing by means of a conductive blade exactly the same as the blade 9 shown in FIG. 2.

The conductive leaf 10, however, ensures the electrical connection of the other electrical terminal of the transducer 8 to the duct 2 to which the monitor is applied. This duct is also connected to a reference potential, for example to earth.

In operation, the variations in the pressure of the fluid in the duct 2 cause mechanical deformations of the piezoelectric transducers housed in the monitoring device and corresponding variations in the electrical signals output thereby. These electrical signals may be picked up directly by the casing itself, for example, by means of an electric wire soldered to any point on the outer surface of the container or casing.

The solution according to the invention, as well as having considerable simplicity of construction and assembly, allows the signal output by the transducers housed by the monitor to be picked up extremely simply and ensures more reliable and safer operation of the device itself.

We claim:

1. A device for monitoring the pressure of fluid in an electrically conductive duct comprising at least one electrical pressure transducer connectable mechanically and electrically to the outer surface of said duct, resilient, non-electrically conductive support means for keeping said at least one transducer in operative electrical connection with said duct, rigid, electrically conductive metal casing means formed in two parts hinged together surrounding and protecting said support means and said at least one transducer for clamping said at least one transducer to said duct by means of said support means and electrically conductive blade means contacting said transducer and said casing means whereby output signals are transmitted from said transducer to said casing.

* * * * *